US012001710B2

(12) United States Patent
Subramanian et al.

(10) Patent No.: US 12,001,710 B2
(45) Date of Patent: Jun. 4, 2024

(54) DYNAMIC UPDATE OF CONSOLIDATED DATA BASED ON GRANULAR DATA VALUES

(71) Applicant: SAP SE, Walldorf (DE)

(72) Inventors: Hari Venkatesh Subramanian, Wiesloch (DE); Florian Roll, Cologne (DE); Joerg Franke, Bruchsal (DE); Joerg Weller, Wieblingen (DE); Dimitrij Raev, Biebesheim am Rhein (DE); Stefan Kraus, Bruchsal (DE)

(73) Assignee: SAP SE, Walldorf (DE)

( * ) Notice: Subject to any disclaimer, the term of this patent is extended or adjusted under 35 U.S.C. 154(b) by 13 days.

(21) Appl. No.: 17/870,712

(22) Filed: Jul. 21, 2022

(65) Prior Publication Data
US 2024/0028250 A1    Jan. 25, 2024

(51) Int. Cl.
*G06F 3/06* (2006.01)
*G06F 16/25* (2019.01)

(52) U.S. Cl.
CPC ............ *G06F 3/0655* (2013.01); *G06F 3/061* (2013.01); *G06F 3/0683* (2013.01); *G06F 16/258* (2019.01)

(58) Field of Classification Search
None
See application file for complete search history.

(56) References Cited

U.S. PATENT DOCUMENTS

2021/0303466 A1\* 9/2021 Kondiles ............... G06F 16/221

\* cited by examiner

*Primary Examiner* — Scott C Sun
(74) *Attorney, Agent, or Firm* — Klarquist Sparkman, LLP

(57) ABSTRACT

Techniques and solutions are provided for updating or augmenting consolidated data that is produced using base data. The consolidated data can include data that is aggregated by various grouping criteria. After a set of consolidated data is determined, the base data may change, one or more rules used to calculate the consolidated data may change, or it may be desired to see data that is more granular than that included in the consolidated data. After consolidated data is provided to a user, a user issues a data augmentation request. The data augmentation request causes the base data, which may have been updated, to be processed to provide updated data, where the processing includes grouping operations used in producing the consolidated data. The updated data is provided to a client in response to the data augmentation request.

20 Claims, 13 Drawing Sheets

410 →

| Location_ID | Water_Collected_T1 |
|---|---|
| 1 | 10 |
| 2 | 12 |
| 3 | 8 |
| 4 | 26 |
| 5 | 4 |
| 6 | 21 |
| 7 | 22 |
| 8 | 16 |
| 9 | 7 |
| 10 | 45 |

404
Group I: 1, 2, 3
Group II: 4, 5, 6, 7
Group III: 1, 8, 9
Group IV: 2, 6, 10
Group V: Groups I-IV

420

| GroupID | LocID | H_Level | WaterCollected_T1 |
|---|---|---|---|
| 1 |  | 1 | 30 |
| 1 | 1 | 2 | 10 |
| 1 | 2 | 2 | 12 |
| 1 | 3 | 2 | 8 |
| 2 |  | 1 | 73 |
| 2 | 4 | 2 | 26 |
| 2 | 5 | 2 | 4 |
| 2 | 6 | 2 | 21 |
| 2 | 7 | 2 | 22 |
| 3 |  | 1 | 33 |
| 3 | 1 | 2 | 10 |
| 3 | 8 | 2 | 16 |
| 3 | 9 | 2 | 7 |
| 4 |  | 1 | 78 |
| 4 | 2 | 2 | 12 |
| 4 | 6 | 2 | 21 |
| 4 | 10 | 2 | 45 |
| 5 |  | 0 | 171 |

SUM = 214
SUM = 171

| Location_ID | Water_Collected_T1 |
|---|---|
| 1 | 10 |
| 2 | 12 |
| 3 | 24 |
| 4 | 26 |
| 5 | 4 |
| 6 | 21 |
| 7 | 22 |
| 8 | 16 |
| 9 | 7 |
| 10 | 45 |

404

Group I: 1, 2, 3
Group II: 4, 5, 6, 7
Group III: 1, 8, 9
Group IV: 2, 6, 10
Group V: Groups I-IV 520                                                                 524

| GroupID | LocID | H_Level | WaterCollected_T1 |
|---|---|---|---|
| 1 |  | 1 | 46 |
| 1 | 1 | 2 | 10 |
| 1 | 2 | 2 | 12 |
| 1 | 3 | 2 | 24 |
| 2 |  | 1 | 73 |
| 2 | 4 | 2 | 26 |
| 2 | 5 | 2 | 4 |
| 2 | 6 | 2 | 21 |
| 2 | 7 | 2 | 22 |
| 3 |  | 1 | 33 |
| 3 | 1 | 2 | 10 |
| 3 | 8 | 2 | 16 |
| 3 | 9 | 2 | 7 |
| 4 |  | 1 | 78 |
| 4 | 2 | 2 | 12 |
| 4 | 6 | 2 | 21 |
| 4 | 10 | 2 | 45 |
| 5 |  | 0 | 187 |

FIG. 5

| GroupID | LocID | H_Level | WaterCollected_T1_C | WaterCollected_T1_A | Water Collected Δ |
|---|---|---|---|---|---|
| 1 | 1 | 1 | 30 | 46 | 16 |
| 1 | 1 | 2 | 10 | 10 | 0 |
| 1 | 2 | 2 | 12 | 12 | 0 |
| 1 | 3 | 2 | 8 | 24 | 16 |
| 2 | 4 | 1 | 73 | 73 | 0 |
| 2 | 5 | 2 | 26 | 26 | 0 |
| 2 | 6 | 2 | 4 | 4 | 0 |
| 2 | 7 | 2 | 21 | 21 | 0 |
| 3 | 1 | 2 | 22 | 22 | 0 |
| 3 | 8 | 1 | 33 | 49 | 0 |
| 3 | 9 | 2 | 10 | 10 | 0 |
| 3 | 2 | 2 | 16 | 16 | 0 |
| 4 | 2 | 1 | 7 | 7 | 0 |
| 4 | 6 | 2 | 78 | 78 | 0 |
| 4 | 10 | 2 | 12 | 12 | 0 |
| 4 | | 0 | 21 | 21 | 0 |
| 5 | | 0 | 45 | 45 | 0 |
| | | | 171 | 187 | 16 |

| Location_ID | Water_Collected_T1 (712) | Water_Collected_T2 (714) |
|---|---|---|
| 1 | 10 | 0 |
| 2 | 12 | 5 |
| 3 | 8 | 15 |
| 4 | 26 | 2 |
| 5 | 4 | 8 |
| 6 | 21 | 6 |
| 7 | 22 | 22 |
| 8 | 16 | 16 |
| 9 | 7 | 1 |
| 10 | 45 | 33 |

404 ⟶ Group I: 1, 2, 3
Group II: 4, 5, 6, 7
Group III: 1, 8, 9
Group IV: 2, 6, 10
Group V: Groups I-IV

720 ⟶

| GroupID | LocID | H_Level | WaterCollected |
|---|---|---|---|
| 1 |   | 1 | 50 |
| 1 | 1 | 2 | 10 |
| 1 | 2 | 2 | 17 |
| 1 | 3 | 2 | 23 |
| 2 |   | 1 | 111 |
| 2 | 4 | 2 | 28 |
| 2 | 5 | 2 | 12 |
| 2 | 6 | 2 | 27 |
| 2 | 7 | 2 | 44 |
| 3 |   | 1 | 50 |
| 3 | 1 | 2 | 10 |
| 3 | 8 | 2 | 32 |
| 3 | 9 | 2 | 8 |
| 4 |   | 1 | 122 |
| 4 | 2 | 2 | 17 |
| 4 | 6 | 2 | 27 |
| 4 | 10 | 2 | 78 |
| 5 |   | 0 | 279 |

SUM = 214
SUM = 171

FIG. 7

| GroupID | LocID | H_Level | WaterCollected_P1_C | WaterCollected_P1_A | Water Collected Δ |
|---|---|---|---|---|---|
| 1 | 1 | 1 | 30 | 50 | 20 |
| 1 | 2 | 2 | 10 | 10 | 0 |
| 1 | 2 | 2 | 12 | 17 | 5 |
| 1 | 3 | 2 | 8 | 23 | 15 |
| 2 | 4 | 1 | 73 | 111 | 38 |
| 2 | 5 | 2 | 26 | 28 | 2 |
| 2 | 6 | 2 | 4 | 12 | 8 |
| 2 | 7 | 2 | 21 | 27 | 6 |
| 3 | 1 | 2 | 22 | 44 | 22 |
| 3 | 8 | 1 | 33 | 50 | 17 |
| 3 | 9 | 2 | 10 | 10 | 0 |
| 3 | 2 | 2 | 16 | 32 | 16 |
| 4 | 2 | 1 | 7 | 8 | 1 |
| 4 | 6 | 2 | 78 | 122 | 44 |
| 4 | 10 | 2 | 12 | 17 | 5 |
| 4 | 10 | 2 | 21 | 27 | 6 |
| 5 |  | 0 | 45 | 78 | 33 |
|  |  | 0 | 171 | 279 | 108 |

FIG. 8

| Aggregation | Granularity | Per. 0 | Per. 1 | Per. 2 | Per. 3 | Per. 4 | Per. 5 | Per. 6 | Per. 7 | Per. 8 | Per. 9 | Per. 10 | Per. 11 | Per. 12 |
|---|---|---|---|---|---|---|---|---|---|---|---|---|---|---|
| Data | | 100 | 10 | 10 | 10 | 10 | 10 | 10 | 10 | 10 | 10 | 10 | 10 | 10 |
| Periodic | Monthly | 100 | 10 | 10 | 10 | 10 | 10 | 10 | 10 | 10 | 10 | 10 | 10 | 10 |
| Cumulative | Monthly | 100 | 110 | 120 | 130 | 140 | 150 | 160 | 170 | 180 | 190 | 200 | 210 | 220 |
| Periodic | Quarterly | | | | 30 | | | 30 | | | 30 | | | 30 |
| Cumulative | Quarterly | | | | 130 | | | 160 | | | 190 | | | 220 |
| Periodic | Semiannually | | | | | | | 60 | | | | | | 60 |
| Cumulative | Semiannually | | | | | | | 160 | | | | | | 220 |
| Periodic | Annually | | | | | | | | | | | | | 120 |
| Cumulative | Annually | | | | | | | | | | | | | 220 |

FIG. 9

DYNAMIC UPDATE OF CONSOLIDATED DATA BASED ON GRANULAR DATA VALUES

FIELD

The present disclosure generally relates to providing access to updated or augmented data for a consolidated data set based on updates to granular data. Particular examples provide for processing updated granular data such that the data can be integrated with previously consolidated data.

BACKGROUND

Databases of various types can be used to store huge amounts of data. Data can often have different stages in a lifecycle for the data, and can undergo various types of processing. For example, data may be in an unreleased or unofficial state, and later be released, "posted," or otherwise given a more permanent status or an indication of higher quality or validity. As for processing, it is common for certain times of data, including timeseries data, to initially be obtained in a very granular form, and to later be processed to provide less granular/coarser data. Or, other types of data can be derived at least in part by processing the granular data, such as for analytical or reporting purposes. For instance, OLTP databases typically record details for individual transactions, which then get aggregated in an OLAP database for data analysis purposes. In the case of OLTP/OLAP databases, key performance indicators can be calculated from OLTP data, and included in the tables or views of an OLAP database.

Issues can arise when data is consolidated or processed. For example, data might change in a transactional database, where the changes might not be reflected in the OLAP database, or there might be a delay in updating the OLAP data. Or, it might be desired to process data in a way that is different from rules used to produce OLAP, or other types of data produced from base data. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for updating or augmenting consolidated data that is produced using base data. The consolidated data can include data that is aggregated by various grouping criteria. After a set of consolidated data is determined, the base data may change, one or more rules used to calculate the consolidated data may change, or it may be desired to see data that is more granular than that included in the consolidated data. After consolidated data is provided to a user, a user issues a data augmentation request. The data augmentation request causes the base data, which may have been updated, to be processed to provide updated data, where the processing includes grouping operations used in producing the consolidated data. The updated data is provided to a client in response to the data augmentation request.

In one aspect, the present disclosure provides a method for augmenting consolidated data with updated base data. Consolidated data is calculated from base data in a first set of one or more data artifacts of a first database. The calculations include performing one or more grouping operations. The consolidated data is stored in a second set of one or more data artifacts in a second database, where the second database is the first database or is a database different than the first database. At least a portion of the consolidated data is provided to a client to be displayed to a user. A data augmentation request is received from a client. At least a portion of the base data is processed to provide updated data. The processing includes performing one or more grouping operations. The updated data is sent to the client in response to the data augmentation request.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIGS. 4-8 illustrate base data, consolidated data, and various implementations of augmented/integrated data that can be produced therefrom, in an example scenario.

FIG. 9 is a table illustrating the operation of various aggregation types.

DETAILED DESCRIPTION

Example 1—Overview

Figure 1:
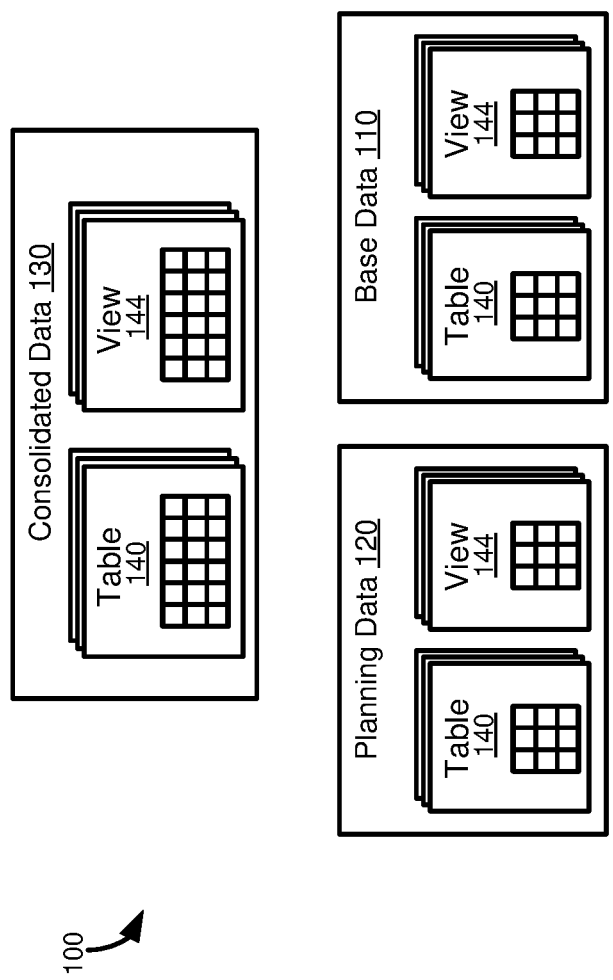
FIG. 1 is a diagram of a data environment in which disclosed technologies can be implemented, illustrating how consolidated data can be produced from base data, and optionally planning data.

Databases of various types can be used to store huge amounts of data. Data can often have different stages in a lifecycle for the data, and can undergo various types of processing. For example, data may be in an unreleased or unofficial state, and later be released, "posted," or otherwise given a more permanent status or an indication of higher quality or validity. As for processing, it is common for certain times of data, including timeseries data, to initially be obtained in a very granular form, and to later be processed to provide less granular/coarser data. Or, other types of data can be derived at least in part by processing the granular data, such as for analytical or reporting purposes. For instance, OLTP databases typically record details for individual transactions, which then get aggregated in an OLAP database for data analysis purposes. In the case of OLTP/OLAP databases, key performance indicators can be calculated from OLTP data, and included in the tables or views of an OLAP database.

Issues can arise when data is consolidated or processed. For example, data might change in a transactional database, where the changes might not be reflected in the OLAP database, or there might be a delay in updating the OLAP data. Or, it might be desired to process data in a way that is different from rules used to produce OLAP, or other types of data produced from base data.

Some database systems, such as the HANA database of SAP SE of Walldorf, Germany, provide for both OLTP and OLAP processing in a single database. However, it is still common for granular data to be initially stored in OLTP-like tables, which are often maintained in row-store format and have many attributes, and then to be processed and stored in OLAP-like tables, which are often maintained in column-store format, have fewer attributes, and often include "summary" data rather than granular data as stored in the OLTP tables. Accordingly, room for improvement exists.

The present disclosure provides technologies that assist users in interacting with data from different data sources or otherwise interacting with data at different granularities or interacting with both "raw," or "base," data and processed data. In a specific example, elements of base data, such as rows in a database table or view, can be associated with different groups. For instance, timeseries data can be associated with individual sensors or devices, including Internet of Things (IOT) devices. Or, other types of data, such as data associated with a company, can be associated with different business units or geographic areas.

For analysis purposes, it may be useful to work with data in groups. Data from individual IOT devices may be aggregated or processed to provide information about a particular environment, for example. However, it may be that data for the overall environment is of particular interest, rather than data from any individual sensor or individual IOT device. Or, the IOT devices may take readings at a particular frequency, such as hourly, but it could be that weekly or monthly trends are of particular interest. Similarly, from a business perspective, it may be useful to evaluate data for the business by particular business units or geographic divisions. So, the granular data from the IOT devices or individual business transactions can be periodically processed, including summarizing/aggregating data, or performing calculations on the granular data to provide processed data.

In many cases, summarizing, aggregating, or other processing of data may only happen periodically. Typically, this would mean that there would be a gap between when granular data was last processed and when a user might be interested in accessing particular types of processed data. Disclosed techniques can address this issue by processing granular data on demand in a way that produces the same or analogous types of data as the processed data.

Disclosed techniques can also be used to compare less granular data, or derived data from more granular data, with granular data, including by processing the granular data in a way that allows for comparison with the less granular/derived data. In particular, grouping can be applied to the granular data, along with calculations, that allow the previously obtained grouped data to be compared with values obtained directly from the granular data. One benefit to this is that the grouped data values calculated directly from the granular data can account for data values that might have changed in the granular data since the last grouped data was obtained, to account for new data, or to allow for the comparison of different types of processing, whether or not changed/new data is also available in the granular data.

In some cases, differences between previously aggregated or summarized data and data calculated from the granular data can be presented, which can assist a user in understanding how data changes might have affected expected results, or understanding the impact of rule changes. Similarly, a user can be provided with options to navigate from higher-level data to values calculated directly from the granular data in order to provide a user with a greater amount of information. A user can also be provided with options to navigate from higher-level data to more granular/base data, or data attributes, that might not be available in the higher-level data. For example, higher-level data may group on some attributes of, or attributes derived from, the granular data, but not on others. Or, it may be desirable to calculate a derived value that is not included in a "standard" set of higher-level data.

In some cases, disclosed technologies can improve the performance of a computer by allowing updated data values, including for data groups, to be calculated without recalculating all high-level data. The techniques can also help preserve data integrity and availability by allowing users to obtain higher-level data without altering a "standard" set of higher-level data that may be needed by other users.

Example 2—Example Data Environment with Consolidated Data and Base Data

FIG. 1 illustrates an example data environment 100 with which described innovations can be used. The data environment 100 can represent a data schema, such as a schema of a relational database system. The data environment 100 includes base data 110, planning data 120, and consolidated data 130. The base data 110 can represent granular data, such as for individual sensors or IOT devices, or for individual business transactions. The planning data 120 can include data that corresponds to all or a portion of the base data 110, or data that can be derived from the base data 110. For example, planning data 120 can represent projected resource consumption or resource expenditure. The base data 110 can represent actual resource consumption or resource expenditure. The consolidated data 130 can include elements (such as attributes, or fields, in the context of a relational database) of the base data 110, the planning data 120, or data derived at least in part from the base data, the planning data, or both. In at least some cases, the use of the planning data 120 is optional.

In many use scenarios, the base data 110, planning data 120, and consolidated data 130 will include different numbers of attributes or fields, and the nature of some or all of the fields can differ as well. Often, the base data 110 will include a much larger number of fields than the planning data 120 or the consolidated data 130. In some cases, this can be due to multiple fields for the base data 110 being used in determining a single field in the consolidated data 130. Planning is often made at the granularity/attributes of the consolidated data 130, and so the attributes of the planning data 120 can also be fewer in number than for the base data 110, and there can be greater correspondence in type between the planning data and the consolidated data than between the base data and either the planning data or the consolidated data.

The base data 110, planning data 120, and consolidated data 130 are shown as containing tables 140 and views 144.

However, depending on the implementation, not all of the data sources 110, 120, 130 need include both tables 140 and views 144. For instance, the base data 110 can be stored in a single table. In a particular example, the base data 110 is the ACDOCA table, the planning data 120, is the ACDOCP table, and the consolidated data 130 is the ACDOCU table, all as implemented in products available from SAP SE, of Walldorf, Germany.

In some cases, tables 140 serve to supply data to a view 144 that combines data from multiple tables, processed data from one or more tables, or both. The view 144 then can serve as a primary data source, while further views can reference a base view, and can restrict or further process data available in the base view. In other cases, a table 140 can serve as the primary/most complete data source, and views 144 on the table can restrict or process data available in the base table.

Whether a set of data is present as a table 140 or as a view 144 can also depend on implementation. For example, if all data sources 110, 120, 130 are part of a common schema, then it may be more likely that the consolidated data 130 is a view on the base data 110, and optionally the planning data 120. On the other hand, if the consolidated data 130 is in a different database system, or uses a different schema, than the consolidated data, at least a "base" version of the data is more likely to be in a table 140, as the data obtained/processed from the base data 110 (and optionally the planning data 120) can be written to the table as part of a ETL (extract, transform, load) or ELT (extract, load, transform) process.

Figure 2:
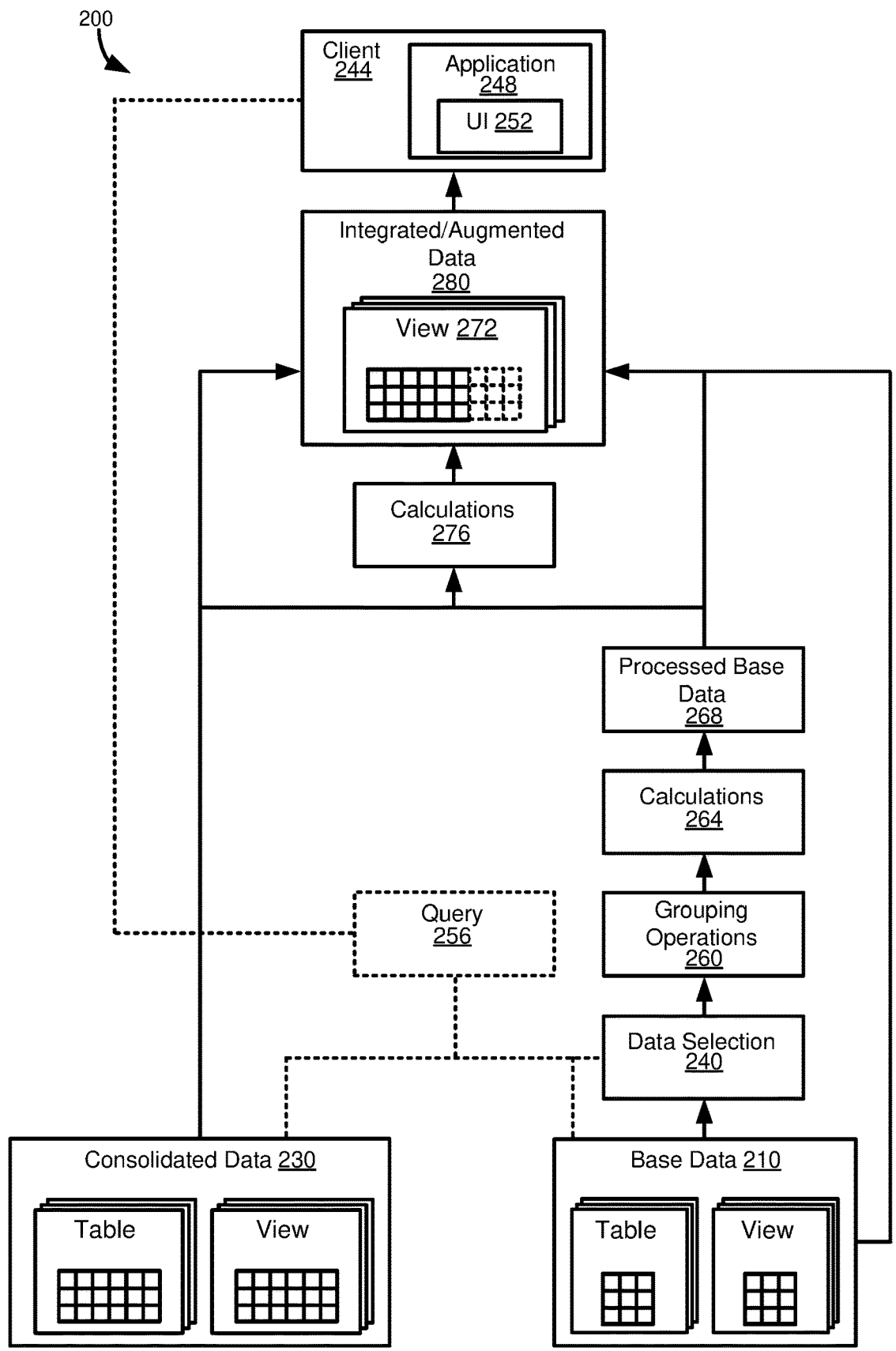
FIG. 2 is a diagram of a computing environment in which disclosed technologies can be implemented, illustrating how integrated/augmented data for consolidated data can be generated from base data in response to a client request.

Example 3—Example Processing of Base Data to Integrate With, or Augment, Consolidated Data FIG. 2 illustrates another data environment, 200. The data environment 200 can include the consolidated data 130 of FIG. 1, now shown as consolidated data 230. Similarly, the data environment 200 can include the base data 110 of FIG. 1, now shown as base data 210. Although not shown in FIG. 2, the data environment 200 can optionally include the planning data 120, which has been omitted from FIG. 2 primarily for simplicity of representation and discussion.

As discussed in Example 1, one change that can occur between base data (such as the base data 110, 210) and the consolidated data (such as the consolidated data 130, 230) is that the consolidated data can be grouped, such as having data from sensors or IOT devices rolled up into groups, or having data grouped by various granularities of geography or business unit. Thus, disclosed techniques provide for grouping of base data, including for allowing a comparison of grouped base data versus grouped consolidated data, or for calculating a difference between grouped base data and grouped consolidated data.

FIG. 2 illustrates how base data 210 can be processed for combination or comparison with grouped consolidated data 230. One example operation that can be performed on the base data 210 is data selection at 240. Data selection at 240 can be based on a number of criteria. Some criteria can be the same as, or similar to, criteria used in creating the consolidated data 230. That is, for example, only some attributes of the base data 210 may be used in the consolidated data 230, and some attributes of the base data may be combined in some manner to produce different attributes in the consolidated data. Data selection at 240 can also include selecting data based on various grouping criteria, including selecting a subset of available groups. Data can be filtered or restricted in other ways as part of the data selection at 240, such as filtering data by a date range or a data type, such as based on a status of the data. A status of the data can include whether the data has been released or is currently in an unreleased state.

The data selection at 240 can be "fixed" or have particular selection logic. In other cases, at least a portion of the data selection at 240 can be specified by a user or an application process. For example, FIG. 2 illustrates a client device 244 that includes an application 248, where the application in turn includes a user interface 252. The user interface 252 can allow a user to enter query parameters to define a query 256, including by selecting various filters or selection criteria through UI elements, which can then be formatted into a suitable query.

In some implementations, the query 256 can refer to particular elements of the consolidated data 230 that are of interest to a user, such as particular grouping elements (groups or group elements) or data having particular attribute values. These criteria can be used to select appropriate data from the base data 210. In some cases, the query 256, alone or in combination with the data selection operations 240, can be, or can be similar to, a JOIN operation in a query language. Or, the data selection 240 can include dynamic query elements where runtime values are provided by the query 256 (or otherwise through the user interface 252 or a process of the application 248).

After the data selection operations 240, one or more grouping operations 260 can be performed. In some cases, data can be duplicated between group members, or data from the base data 210 can be associated with multiple groups, such as when a particular group element is part of multiple groups. For instance, data having a geographic content can be associated with a city, a state, a country, or a larger geographic region (e.g., "North America" or "the European Union"). Accordingly, the grouping operations 260 can include various types of duplicate elimination.

Grouped data can be subject to various calculations 264. The calculations 264 can include calculating aggregate values for a group, or other types of data derived from the base data 210. For instance, the calculations 264 can include calculating key performance indicators. The grouping operations 260 and the calculations 264 provide processed data 268.

At least a portion of the processed data 268 can be provided to the client device 244, including through the user interface 252. At least a portion of the processed data 268 can be integrated into a data structure, such as a table or view, including a view 272. The view 272 can include data from the consolidated data 230, as well as processed data 268, and can further include values from the base data 210.

As discussed in Example 1, it can be useful in some cases to present a user with information about differences between values calculated using the base data 210 (including after being processed to produce the processed data 268) and values from the consolidated data 230. Differences and other types of calculations 276 can be performed using both the consolidated data 230 and the processed data 268. Further examples of calculations 276 can include aggregating values of the consolidated data 230 and the processed data 268. In particular, aggregating values of the consolidated data 230 and the processed data 268 can be useful, as it can reduce processing resources use as compared with calculating all values from the base data 210.

The view 272 can be part of integrated/augmented data 280. In general, the integrated/augmented data 280 can include one or more values from the consolidated data 230, values from the base data 210, values from the processed data 268 (or from the grouping operations 260, if no calculations 264 are performed), or values from the calculations 276. In some cases, the integrated/augmented data 280 allows for a comparison of a common attribute based on the base data 210 and based on the consolidated data 230, including having separate columns for the same attribute but having a different data source, or having a column that presents a difference in values between versions of the attribute calculated from different data sources.

All or a portion of the integrated/augmented data 280 can be provided to the application 248 and displayed on the user interface 252. The augmented/integrated data 280 can be persistently stored, including in a database, or can be transitory data that is removed when a consuming process of the application 248 terminates.

Figure 3:
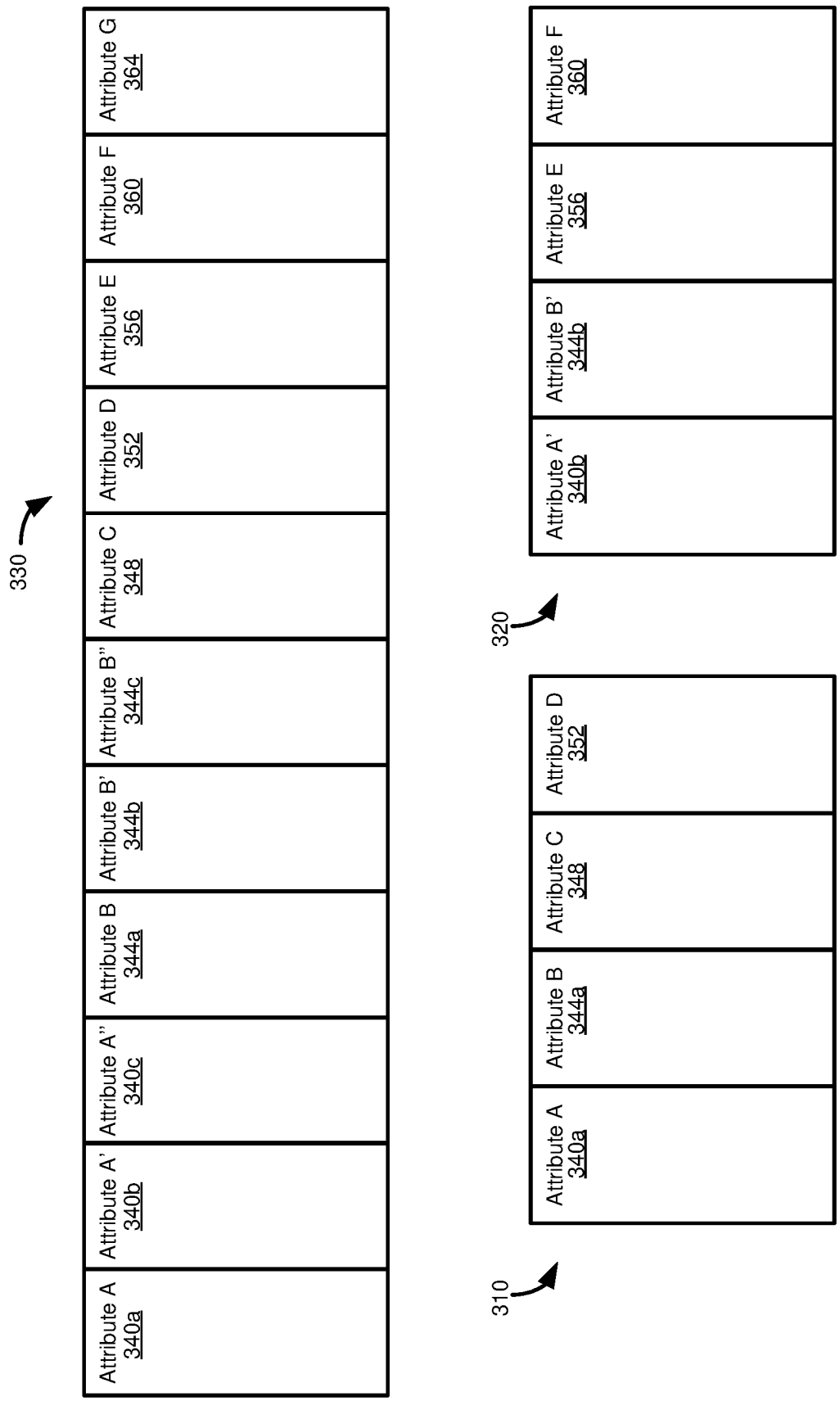
FIG. 3 illustrates how attributes in a table for integrated/augmented data can be related to attributes from consolidated data and processed base data.

Example 4—Example Integrated/Augmented Data that Includes Attributes from Consolidated Data and from Base Data FIG. 3 illustrates how attributes from processed data generated from base data and attributes from consolidated data can be combined to provide integrated/augmented data, where these types of data can be as described in Examples 2 and 3.

In FIG. 3, table 310 represents consolidated data, table 320 represents processed data derived from base data (for example, the processed data 268 of FIG. 2), and table 330 represents integrated/augmented data. Certain attributes, forming columns of the tables 310, 320, 330 can appear in multiple tables, including all tables, while other attributes may only appear in a single table. For example, tables 310, 320, 330 each include an attribute 340, "Attribute A," that is shown in the tables as 340a, 340b, 340c, respectively. Some or all values for the attribute 340 can be the same amongst the tables 310, 320, 330, or some or all of the values for an attribute can differ. Understanding that different versions of an attribute have different values between the tables 310, 320, 330, such as for a particular row of the tables representing a common "entity" (including as represented using a primary key value), can provide useful information to a user, as can the value of the difference between the values of the attributes.

Table 330 is shown as including the versions of 340a, 340b of Attribute A, while version 340c can represent a difference between these two versions of Attribute A. Versions 344a, 344b, 344c of an Attribute B can be analogous to the different versions 340a, 340b, 340c of Attribute A. Some attributes in the table 330, such as attribute 348 (Attribute C) and attribute 352 (Attribute D) can be represented only in the consolidated data table 310, while other attributes, such as attribute 356 (Attribute E) and attribute 360 (Attribute F) are represented only in the table 320 representing processed base data.

Of course, the attributes included in the table 330 can differ based on particular use scenarios, and can include attributes that are not present in the table 310 or the table 320. For example, the table 330 could omit attribute version 340a, 340b, and only include attribute version 340c—a difference between the values of versions 340a, 340b. Or, the table 330 can include an attribute, such as attribute 364 (Attribute G) that is qualitatively different than an attribute in the tables 310, 320, including being based at least in part on/derived at least in part from, an attribute of the table 310, the table 320, or both such tables.

Take, for example, a scenario where data for a particular attribute of the table 310 and/or the table 320 represents temperature data. The table 330 could include any combination of temperature data from the table 310, temperature data from the table 320, a difference in temperature between the tables 310 and 320, or a temperature distribution or a volume calculated from the temperature data. While the temperature data from each table 310, 320 is qualitatively the same, the difference between those values has some qualitative/semantic difference, since it represents temperature difference, not temperature. A temperature distribution or volume calculated from the temperature data can be considered even more qualitatively different from the temperature data.

Example 5—Example Data Integration/Augmentation Scenario

FIGS. 4-8 provide examples of how integrated/augmented data can be determined and presented from consolidated data and from processed base data. FIGS. 4-8 are described using a hypothetical scenario of Internet of Things (IOT) devices having hardware sensors that detect accumulated water. The IOT devices can be grouped using multiple geographic regions, at least some of which can overlap, and where grouping is performed at multiple levels of granularity.

In the hypothetical scenario, there are ten IOT devices which are distributed into four groups as illustrated in the group definition 404 of FIG. 4. In particular, a first group, which can correspond to a first geographic region, includes IOT devices one, two, and three, while a second group can correspond to a geographic region that is disjoint with respect to that of the first group and includes IOT devices four, five, six, and seven. A third group overlaps the first group, as it also includes IOT device one, and further includes IOT devices eight and nine. A fifth group overlaps both the first group and the second group, as it includes IOT device two and IOT device six, and also incudes IOT device 10.

A table 410 includes a location identifier column 412 and a column 414 that indicates water collected at particular location identifiers (IOT device identifiers) at a first, particular time, T1. A table 420 groups the locations according to the group definition 404 and includes a column 424 that identifies a group represented by a given record (row) of the table. A column 428 includes the location identifier (IOT device identifier) for a particular record of the table. A column 432 provides a hierarchy, or grouping level, for a particular record of the table 420. In the case of this hypothetical, IOT device are grouped at a first level, as indicated in the group definition 404, but are also grouped at a second level (also indicated in the group definition), where the second grouping level groups all of the lower-level groups. The table 420 also includes a column 436 that includes water collection data, either for individual IOT devices/locations or for particular groups of IOT devices/locations.

Note that the definition 404 of the groups provides three different IOT devices (1, 2, and 6) that are associated with multiple groups. That is, IOT device 1 is a member of Group I and Group II, IOT device 2 is a member of Group I and Group IV, and IOT device 6 is a member of Group II and Group IV.

In some cases, the inclusion of a given IOT device does not cause "issues" in aggregated/derived values. That is, if Groups I and III are "independent," then it does not matter that the water collected values for the first IOT device are included in both groups. However, now consider Group V, which collects values for all of Groups I-IV, which can be referred to as subgroups of Group V. Now Groups I and III are interdependent, as they both contribute values to Group V. If the water collected values for Group V were simply calculated from the values from Groups I and III, the total would be too high, as it would double-count the values for IOT devices 1, 2, and 6. Accordingly, part of consolidation logic used to produce the table 420 can include de-duplication/duplicate-elimination logic.

In the case where processed base data and consolidated are the same, then the table 420 can represent both/either data set. However, if one data set changes compared with the other, than discrepancies between the data sets will exist, and the table 420 will no longer represent both consolidated data and processed base data.

In some cases, discrepancies can arise because of changes to the base data, and the processed base data produced therefrom, after the consolidated data is produced. Say for example that it was determined that the original value of "8" for IOT device 3 should actually have been "24." The base data could then be updated as shown in the table 510 of FIG. 5, while the consolidated data would still be based on the older-base data from the table 410. Table 520 is similar to the table 420, but has water collected values in a column 524 that are calculated from the updated, base data in the table 510. Entries in the tables 510, 520 that have changed data/are affected by changed data are indicated with dashed rectangles, and correspond to updated data for the individual IOT device 3, Group I, which is the only subgroup that includes IOT device 3, and Group 5, which includes all subgroups, and thus includes subgroup Group I.

Disclosed techniques provided both for the calculation of the updated processed data of the table 520, as well as providing information for comparing the updated processed data, generated from updated base data, with the consolidated data, created using an "old" or "incomplete" version of the IOT data. Data from both the consolidated data of the table 420 and from the updated processed data of the table 520, obtained from the updated IOT device data of the table 510, are presented in a table 610 of FIG. 6.

The table 610 is similar to the tables 420 and 520, in that it includes a group identifier column 612, a location identifier column 614, and a hierarchy level column 616. The table 610 also includes columns 617, 618 corresponding to the column 436 and the column 524. Further, the table 610 includes a "delta" column 622 that is calculated as the difference between values in the columns 616, 618.

Thus, the table 610 provides a variety of information beyond what would be available if the user were only provided with the information in the table 420. In order to facilitate the comparison, grouping logic, as well as other types of processing, can be carried out on the base data to facilitate a one-to-one comparison with the consolidated data, as well as enabling the calculation of delta values. A user can be provided with grouped or otherwise processed data that is produced at regular intervals, or upon the occurrence of specified event (such as releasing or posting of data), as well as grouped/processed data that is not (including not yet) reflected in the consolidated data, but is part of the base data.

In a similar manner, FIG. 7 illustrates a table 710 that has the same water collected values in its column 712 as for the column 414 of table 410, but adds a new column 714 that includes water collected values for a second time period. This second time period can be a time period that is not yet reflected in the consolidated data, such as because a determined interval has not passed or a specified activity, action, or event has not occurred.

Assume that both the first and second time periods are subperiods of a larger time interval, such as first and second periods in a bi-weekly (every two weeks) period. Assume now that the consolidated data of the table 520 is data that was prepared at the end of the first period, but a trigger/interval that would cause the second period to be included in the consolidated data has not yet occurred. Again, then, there is a discrepancy between the base data used to generate the consolidated data and the base data, as well as between the base data and processed data that would be produced from the base data, including using calculations used in producing the consolidated data.

Table 720 is similar to table 620, where data has been aggregated according to the grouping definition 404, in this case combining data from the column 714 for the second time period, as well as data from a column 712 representing the first time period.

As with the table 610, a table 810 of FIG. 8 combines columns 812 from consolidated data of table 420 and columns 814 from the table 720, as well as including a column 816 that provides a delta between the consolidated data and the processed data generated from the current base data.

Note that disclosed techniques can be used in other scenarios, which can be handled analogously to the changed data/additional data scenarios discussed above. For example, instead of having updated actual values, changed data, or added data can represent hypothetical data, which can allow a user to model the effects of data changes and compare the results with results that would be obtained using the consolidated data.

Whether or not any base data is changed or modified, users can also be allowed to modify processing logic, where the user can compare results from current processing logic, as represented in the consolidated data, with results generated from base data (including base data that was used to generate the consolidated data) but using different processing logic. In this case, a table analogous to the table 810 can be generated or presented, but with some columns representing the consolidated data, other columns representing processed base data using the changed processing logic, and where further columns can compare the values obtained using the original processing logic and the updated processing logic.

Example 6—Example Aggregation Types

As has been discussed, at least some base data is typically aggregated or otherwise processed, whether in creating consolidated data or processed base data. Aggregation or processing can be carried out by "groups," but can carried out based on other/additional criteria, including based on a time period. Further, the nature of the aggregation can differ even using the same time period as the aggregation criteria. For example, aggregation time periods can include aggregation by month or quarter, or semiannual or annual aggregation. For these time periods, aggregation can be cumulative or for a discrete period.

Particularly when it is desired to compare consolidated data with processed base data, it is desirable to use the same aggregation type for data sources included in a query or report. Accordingly, a request for processed base data can include a flag (or, more generally, parameters) indicating one or both of an aggregation granularity or period, and an aggregation type, such as cumulative or periodic.

In some cases, an aggregation type or procedure can be manually specified by a user, or a computing process. In other cases, an aggregation type or procedure can be automatically supplied for a request for processed data. For instance, if a user is viewing/interacting with consolidated data and submits a request for processed base data, an aggregation type (granularity, aggregation type) used in a current data view (such as on a user interface screen) can be passed as parameters to be used in executing a request for processed base data.

Table 900 of FIG. 9 illustrates different combinations of aggregation type (periodic or cumulative) for different aggregation time granularities. A column 904 indicates whether aggregation is calculated on a periodic or cumulative basis, while a column 908 indicates aggregation granularity. Table 900 includes specific granularities of monthly, quarterly, semiannually, and annually.

The table 900 includes sample data to help illustrate the operation of different combinations of aggregation period/granularity and aggregation calculation type. The data in table 900 can represent the use case discussed earlier, where IOT devices measure collected water at various locations. The data in the table 900 can represent a single IOT device or a grouping of multiple IOT devices. A column 912 provides a starting value, such as a value carried over from a prior time period. Columns 914-936 represent values calculated for a current time period. In a specific example, the prior time period can be a year, an overall current time period can be a year, and the columns 914-936 can represent particular months of the year.

In the table 900, a row 940 provides example data collected over the various subperiods of the current period, while rows 942-956 provide aggregated values for one or more of the subperiods. For ease of presentation, the data in the row 904 can represent 100 units of water collected in a prior time period (column 912), and 10 units of water are collected at each of the time periods associated with the columns 914-936.

In row 942, the aggregation type is "periodic", and the aggregation granularity is "monthly." Accordingly, since 10 units of water are collected every month, and the values are not cumulative, the columns 914-936 each have a value of "10," and the "prior period" value (100 units of water) is not used in any of the aggregation calculations. In contrast, row 944 is also calculated using monthly periodicity, but is cumulative, and so (1) the "prior period" value of 100 is used in all aggregations; and (2) the value of a "current" subperiod is added to the aggregated value of a "prior" subperiod into order to obtain the value of the current subperiod. Values for the rows 946-956 are calculated in a similar manner Note that the table 900 does not include values for certain subperiods for the rows 946-956. This is because an aggregation is not calculated for those subperiods. For example, for "quarterly" calculations, values are only calculated for the third, sixth, ninth, and twelfth time subperiods, since those correspond to the quarters of a year, while for "semiannual" calculations values are only provided for the sixth and twelfth time period.

Example 7—Example User Interface Techniques for Requesting Integrated/Augmented Data An advantage of disclosed techniques is that they can be used to generate processed base data on the fly/dynamically for comparison with, or to augment, consolidated data. A user interface can provide a user with options to generate processed data while interacting with consolidated data, including as illustrated in FIG. 10.

Figure 10:
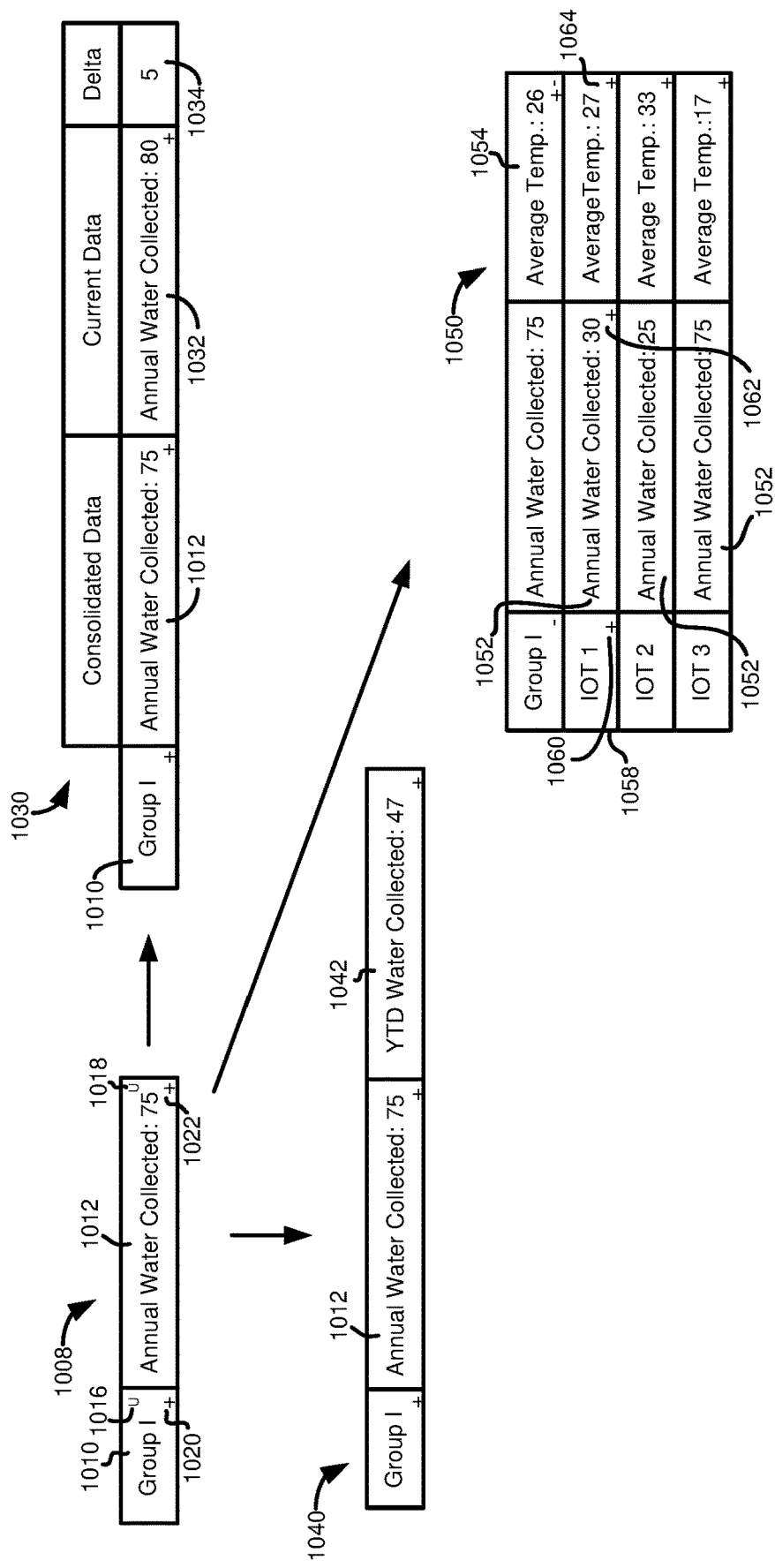
FIG. 10 is a diagram illustrating examples of how a user can choose to display augmented/integrated data, or data otherwise associated with processed base data, when interacting with consolidated data.

FIG. 10 reflects the ongoing hypothetical scenario where consolidated data reflects water collection data recorded by IOT devices. A table 1008 can present information displayed to a user. The table 1008 includes consolidated data 1012 for water collected for a group 1010 over a prior time period, such as a prior year. The table 1008 can include user interface elements that allow a user to take various actions that involve processing base data to generate processed base data, which can then be displayed to a user or used for calculations with consolidated data, the results of which can be presented to user. While a variety of user interface elements, and associated actions, can be used with disclosed technologies, FIG. 10 uses example user interface elements for obtaining for granular data, indicated by a "+" symbol, or for obtaining updated data (from any additional data that might be included in the base data as compared with the state of the base data used to generate the consolidated data), indicated by a "U" symbol.

Referring again to table 1008, cells 1010 and 1012 are each provided with respective "update" UI elements 1016, 1018 and respective "expand" UI elements 1020, 1022. Assume now that a user wishes to obtain updated data for the "annual water collected" data of cell 1012. The user can select the "update" UI element 1018, which can cause processing logic to send a query to base data, which can be obtained and processed as previously described, including with respect to the discussion of FIG. 2.

The results of selecting the UI element 1018 are shown in table 1030. The table 1030 is similar to the table 1008, including because the table 1030 also includes the cells 1010, 1012. However, the table 1030 also includes a cell 1032 that includes a value of water collected for the same time period as the cell 1012, but using current base data. By visual inspection, a user can determine that there is a discrepancy between the values in the cells 1012, 1032. However, the table 1030 includes a cell 1034 that specifically shows the value of the discrepancy. Note that the cells of the table 1030 can also be provided with user interface elements, such as to expand data for a particular row or a particular cell of a particular row.

As another option, rather than, or in addition to, determining if consolidated values differ from what would be produced from current base data because of a change to the base data used for the consolidated data, an "update" request can retrieve values that have been added to base data since the consolidated data was generated. Table 1030 can also represent this scenario, where the data in the cells 1032, 1034 can reflect the impact of additional data, not just changed data. Another example of this use case scenario is provided in table 1040, which can represent, for example, a scenario where an "update" time period for the base data does not overlap with a time period used for the consolidated data. That is, the table 1040 also includes the cell 1012, and further includes a cell 1042 that includes year to date water collection values, where the values in the cell 1012 can represent water collection for a prior year.

In addition to, or instead of, consolidated data differing from base data because of data changes or addition data, these types of data can also differ in that some values may only be available in the base data, including values that are at a lower level of granularity that is available in the consolidated data. Slightly changing the ongoing hypothetical, assume that grouping of IOT device data occurs at multiple levels, and that the consolidated data only provides data for groups of IOT devices, rather than for individual IOT devices. If a user chooses to select the user interface element XX (or optionally the user interface element XX), a table 1050 can be provided, which includes cells 1052 having water collected values for the individual IOT devices associated with the group.

Note that the table 1050 also includes a column 1054 showing average temperatures recorded by the IOT devices. This can reflect a type of data that is available in the base data, but is not included in the consolidated data. Thus, a user can choose to receive one or both of more granular data or data for attributes that are not included in the consolidated data.

As a further example of how data processing can depend on a particular content of a data request, consider that the table 1050 includes "expand" user interface elements 1060, 1062, 1064 for a row 1058 associated with IOT device 1. Assume further that the base data contains data for more granular time periods than the "annual" data reflected in the values of the row 1058. A user may be allowed to drill down to more granular data, but the nature of the operation can depend on the content in which the command is provided. For example, selecting the user interface element 1060, for the cell identifying IOT device 1, may result in granular data being presented for both the water collected and temperature attributes. On the other hand, selecting user interface elements 1062 or 1064 can cause the retrieval/display of only water collected or temperature attributes. Again, parameters associated with a given cell, such as an aggregation type (grouping level, time period, cumulative versus periodic, etc.) can be passed to query logic, along with identifiers filtering what data is to be selected (for example, selecting only values for Group I, IOT device 1, particular attributes, etc.)

Example 8—Example Operations in Augmenting/Integrating Consolidated Data

Figure 11:
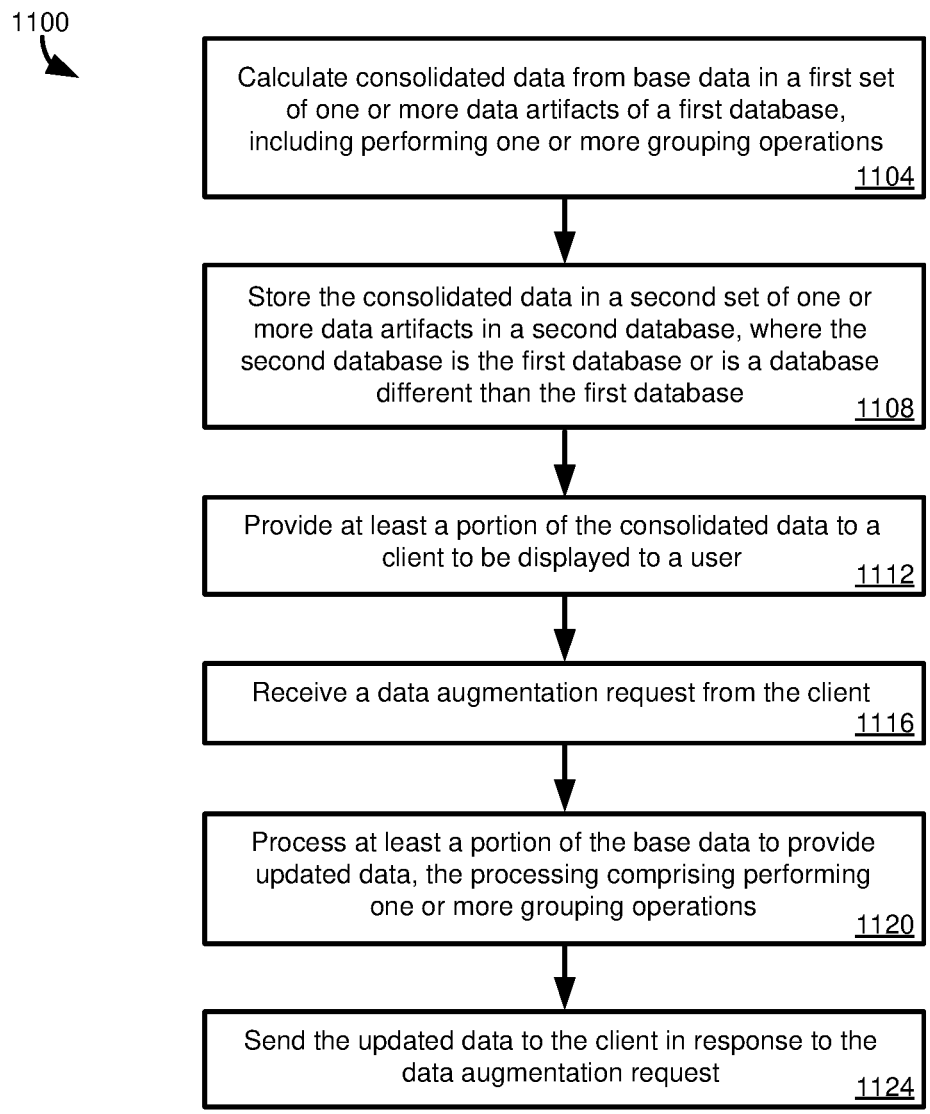
FIG. 11 is a flowchart of operations in an example method of generating processed base data in response to a user request.

FIG. 11 is a flowchart of a method 1100 for augmenting consolidated data with updated base data. The method 1100 can be implemented in the data environment 200 shown in FIG. 2.

At 1104, consolidated data is calculated from base data in a first set of one or more data artifacts of a first database. The calculations include performing one or more grouping operations. The consolidated data is stored at 1108 in a second set of one or more data artifacts in a second database, where the second database is the first database or is a database different than the first database. At least a portion of the consolidated data is provided to a client to be displayed to a user at 1112. A data augmentation request is received from a client at 1116. At 1120, at least a portion of the base data is processed to provide updated data. The processing includes performing one or more grouping operations. The updated data is sent to the client at 1124 in response to the data augmentation request.

Example 9—Computing Systems

Figure 12:
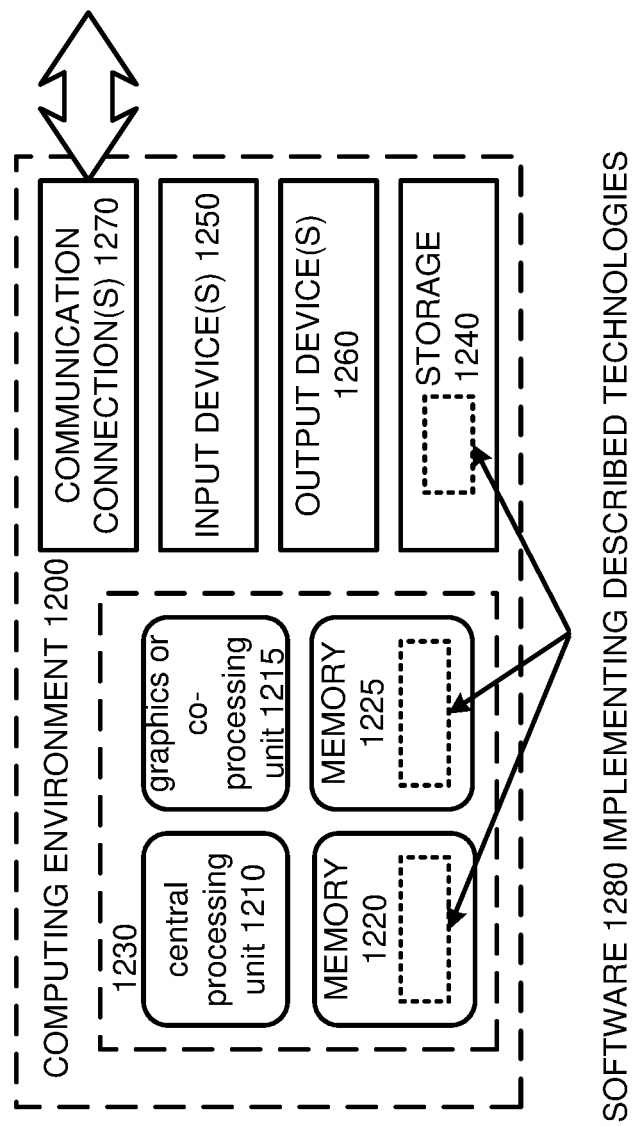
FIG. 12 is a diagram of an example computing system in which some described embodiments can be implemented.

FIG. 12 depicts a generalized example of a suitable computing system 1200 in which the described innovations may be implemented. The computing system 1200 is not intended to suggest any limitation as to scope of use or functionality of the present disclosure, as the innovations may be implemented in diverse general-purpose or special-purpose computing systems.

With reference to FIG. 12, the computing system 1200 includes one or more processing units 1210, 1215 and memory 1220, 1225. In FIG. 12, this basic configuration 1230 is included within a dashed line. The processing units 1210, 1215 execute computer-executable instructions, such as for implementing the technologies described in Examples 1-8. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s) 1210, 1215. The memory 1220, 1225 stores software 1280 implementing one or more innovations described herein, in the form of computer-executable instructions suitable for execution by the processing unit(s) 1210, 1215.

A computing system 1200 may have additional features. For example, the computing system 1200 includes storage 1240, one or more input devices 1250, one or more output devices 1260, and one or more communication connections 1270. An interconnection mechanism (not shown) such as a bus, controller, or network interconnects the components of the computing system 1200. Typically, operating system software (not shown) provides an operating environment for other software executing in the computing system 1200, and coordinates activities of the components of the computing system 1200.

The tangible storage 1240 may be removable or non-removable, and includes magnetic disks, magnetic tapes or cassettes, CD-ROMs, DVDs, or any other medium which can be used to store information in a non-transitory way, and which can be accessed within the computing system 1200. The storage 1240 stores instructions for the software 1280 implementing one or more innovations described herein.

The input device(s) 1250 may be a touch input device such as a keyboard, mouse, pen, or trackball, a voice input device, a scanning device, or another device that provides input to the computing system 1200. The output device(s) 1260 may be a display, printer, speaker, CD-writer, or another device that provides output from the computing system 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10—Cloud Computing Environment

Figure 13:
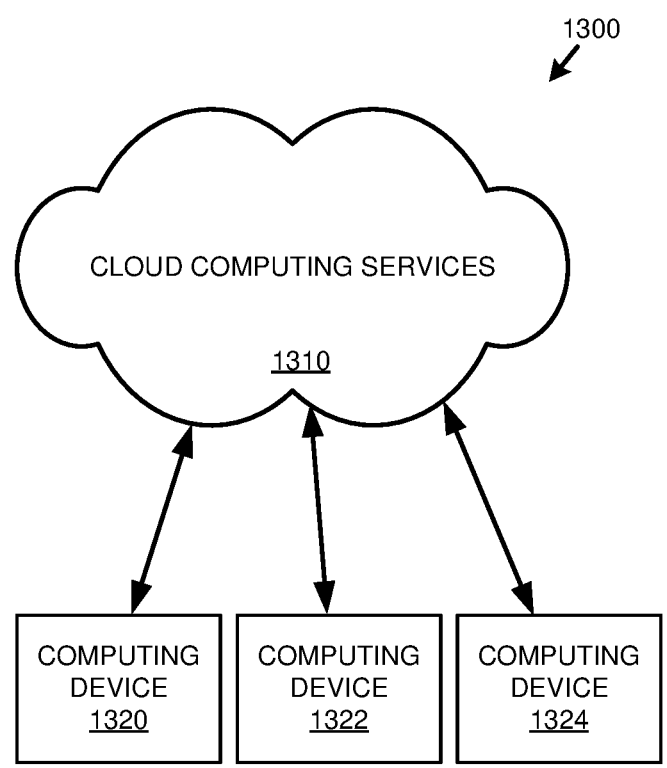
FIG. 13 is an example cloud computing environment that can be used in conjunction with the technologies described herein.

FIG. 13 depicts an example cloud computing environment 1300 in which the described technologies can be implemented. The cloud computing environment 1300 comprises cloud computing services 1310. The cloud computing services 1310 can comprise various types of cloud computing resources, such as computer servers, data storage repositories, networking resources, etc. The cloud computing services 1310 can be centrally located (e.g., provided by a data center of a business or organization) or distributed (e.g., provided by various computing resources located at different locations, such as different data centers and/or located in different cities or countries).

The cloud computing services 1310 are utilized by various types of computing devices (e.g., client computing devices), such as computing devices 1320, 1322, and 1324. For example, the computing devices (e.g., 1320, 1322, and 1324) can be computers (e.g., desktop or laptop computers), mobile devices (e.g., tablet computers or smart phones), or other types of computing devices. For example, the computing devices (e.g., 1320, 1322, and 1324) can utilize the cloud computing services 1310 to perform computing operators (e.g., data processing, data storage, and the like).

Example 11—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 12, computer-readable storage media include memory 1220 and 1225, and storage 1240. The term computer-readable storage media does not include signals and carrier waves. In addition, the term computer-readable storage media does not include communication connections (e.g., 1270).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perk JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
at least one memory;
at least one hardware processor coupled to the at least one memory; and
one or more computer-readable storage media storing computer-executable instructions that, when executed, cause the computing system to perform operations comprising:
calculating consolidated data from base data in a first set of one or more data artifacts of a first database, the calculating comprising performing one or more grouping operations;
storing the consolidated data in a second set of one or more data artifacts in a second database, wherein the second database is the first database or is a database different than the first database;
providing at least a portion of the consolidated data to a client to be displayed to a user on a first user interface;
receiving through a second user interface a data augmentation request from the client, the data augmentation request comprising one or more values to be used as search criteria, wherein the second user interface is the first user interface or is a user interface other than the first user interface;
processing at least a portion of the base data using the search criteria to provide updated data, the processing comprising performing one or more grouping operations, wherein the processing at least a portion of the base data comprises processing data retrieved from the base data using the search criteria; and
sending the updated data to the client to be displayed on a third user interface in response to the data augmentation request, wherein the third user interface is the first user interface, the second user interface, or a user interface other than the first user interface and the second user interface.

2. The computing system of claim 1, wherein the processing at least a portion of the base data comprises processing at least one attribute that is not present in the consolidated data and the updated data comprises the at least one attribute or an attribute having a value calculated at least in part using a value of the at least one attribute.

3. The computing system of claim 1, wherein an attribute of the updated data is calculated from a first set of data having at least one value that differs from a second set of data used to calculate the consolidated data.

4. The computing system of claim 3, wherein the at least one value comprises a changed value.

5. The computing system of claim 3, wherein the at least one value comprises an added value.

6. The computing system of claim 1, wherein the updated data is at a first level of granularity that is more granular than a level of granularity available in the consolidated data.

7. The computing system of claim 1, the operations further comprising:
calculating a difference between a value of the updated data and a corresponding value of the consolidated data; and
sending the difference with the updated data.

8. The computing system of claim 1, wherein the calculating the consolidated data and the processing at least a portion of the base data comprise removing duplicate values.

9. The computing system of claim 1, the operations further comprising:
displaying at least a portion of the updated data concurrently with at least a portion of the consolidated data.

10. The computing system of claim 9, wherein the at least a portion of the updated data and the at least a portion of the consolidated data comprises data for a same attribute.

11. The computing system of claim 1, the operations further comprising:
displaying a difference between a value of the updated data and a value of the consolidated data.

12. The computing system of claim 1, wherein the consolidated data comprises a first value for a first time period for a first attribute and the updated data comprises a second value for a second time period for the first attribute, the second time period being more recent than the first time period.

13. The computing system of claim 1, wherein the updated data comprises, or is derived at least in part on, data that is an unposted or unreleased state.

14. The computing system of claim 1, wherein the consolidated data is calculated from a first version of the base data and the updated data is calculated from a second version of the base data, wherein the second version of the base data comprises data that is not included in the first version of the base data.

15. The computing system of claim 1, the operations further comprising:
rendering at least a portion of the consolidated data on the first user interface;
receiving user input to obtain augmented data, providing the data augmentation request;
determining a context associated with the user input; and
providing one or more values associated with the context as values of the one or more value to be used as search criteria.

16. The computing system of claim 1, wherein the one or more values comprise an attribute identifier.

17. The computing system of claim 1, wherein the one or more values comprise an aggregation type.

18. The computing system of claim 1, wherein the one or more values comprise a group identifier.

19. A method, implemented in a computing system comprising at least one memory and at least one hardware processor coupled to the at least one memory, the method comprising:
calculating consolidated data from base data in a first set of one or more data artifacts of a first database, the calculating comprising performing one or more grouping operations;
storing the consolidated data in a second set of one or more data artifacts in a second database, wherein the second database is the first database or is a database different than the first database;

providing at least a portion of the consolidated data to a client to be displayed to a user on a first user interface;

receiving through a second user interface a data augmentation request from the client, the data augmentation request comprising one or more values to be used as search criteria, wherein the second user interface is the first user interface or is a user interface other than the first user interface;

processing at least a portion of the base data using the search criteria to provide updated data, the processing comprising performing one or more grouping operations, wherein the processing at least a portion of the base data comprises processing data retrieved from the base data using the search criteria; and sending the updated data to the client to be displayed on a third user interface in response to the data augmentation request, wherein the third user interface is the first user interface, the second user interface, or a user interface other than the first user interface and the second user interface.

20. One or more non-transitory computer-readable storage media comprising:

computer-executable instructions that, when executed by a computing system comprising at least one memory and at least one hardware processor coupled to the at least one memory, cause the computing system to calculate consolidated data from base data in a first set of one or more data artifacts of a first database, the calculating comprising performing one or more grouping operations;

computer-executable instructions that, when executed by the computing system, cause the computing system to provide at least a portion of the consolidated data to a client to be displayed to a user on a first user interface;

computer-executable instructions that, when executed by the computing system, cause the computing system to store the consolidated data in a second set of one or more data artifacts in a second database, wherein the second database is the first database or is a database different than the first database;

computer-executable instructions that, when executed by the computing system, cause the computing system to receive through a second user interface a data augmentation request from the client, the data augmentation request comprising one or more values to be used as search criteria, wherein the second user interface is the first user interface or is a user interface other than the first user interface;

computer-executable instructions that, when executed by the computing system, cause the computing system to process at least a portion of the base data using the search criteria to provide updated data, the processing comprising performing one or more grouping operations, wherein the processing at least a portion of the base data comprises processing data retrieved from the base data using the search criteria; and computer-executable instructions that, when executed by the computing system, cause the computing system to send the updated data to the client to be displayed on a third user interface in response to the data augmentation request, wherein the third user interface is the first user interface, the second user interface, or a user interface other than the first user interface and the second user interface.

\* \* \* \* \*